United States Patent [19]

Freeborn

[11] 4,160,157
[45] Jul. 3, 1979

[54] SIGNAL TRANSMISSION CIRCUIT WITH IMPROVED DIGITAL SIGNAL RECOVERY

[75] Inventor: John C. Freeborn, West Covina, Calif.

[73] Assignee: Honeywell Inc., Minneapolis, Minn.

[21] Appl. No.: 752,228

[22] Filed: Dec. 20, 1976

[51] Int. Cl.² .................................................. G02B 5/14
[52] U.S. Cl. ............................. 250/199; 179/170 HF; 325/13; 328/164
[58] Field of Search ...................... 250/199; 325/1, 13; 328/164; 179/170 HF, 15 AD

[56] References Cited

U.S. PATENT DOCUMENTS

| 2,797,340 | 6/1957 | Bennett | 179/15 AD |
| 3,979,746 | 9/1976 | Jarrett | 340/347 DD |

OTHER PUBLICATIONS

Gundlach, "Fiber–Optic Developments Spark World–Wide Interest", *Electronic*, Aug. 5, 1976, (pp. 81-104).
Schmid, "Fiber–Optic Data Transmission: A Practical Low Cost Technology", *Electronics*, 9-2-76, (pp. 94-99).
Hodapp, "Optical Isolators Yield Benefits in Many Linear Circuits," *Electronics*, 3-4-76, (pp 105-110).

*Primary Examiner*—Robert L. Griffin
*Assistant Examiner*—Edward L. Coles
*Attorney, Agent, or Firm*—Charles L. Rubow

[57] ABSTRACT

A feedback circuit and method are disclosed for restoring high frequency digital signals degraded by signal transmitting means whose upper frequency limit is below that required for accurate signal transmission. The restored digital output signal is supplied by a digitizing circuit which produces a signal having first and second values in response to input signal amplitudes respectively less than and greater than a digitizing threshold. The input signal to the digitizing circuit comprises a combination of the degraded signal, and a feedback signal generated by passing the output signal through a feedback circuit whose response to high frequency signals is substantially identical to that of the signal transmitting means.

4 Claims, 3 Drawing Figures

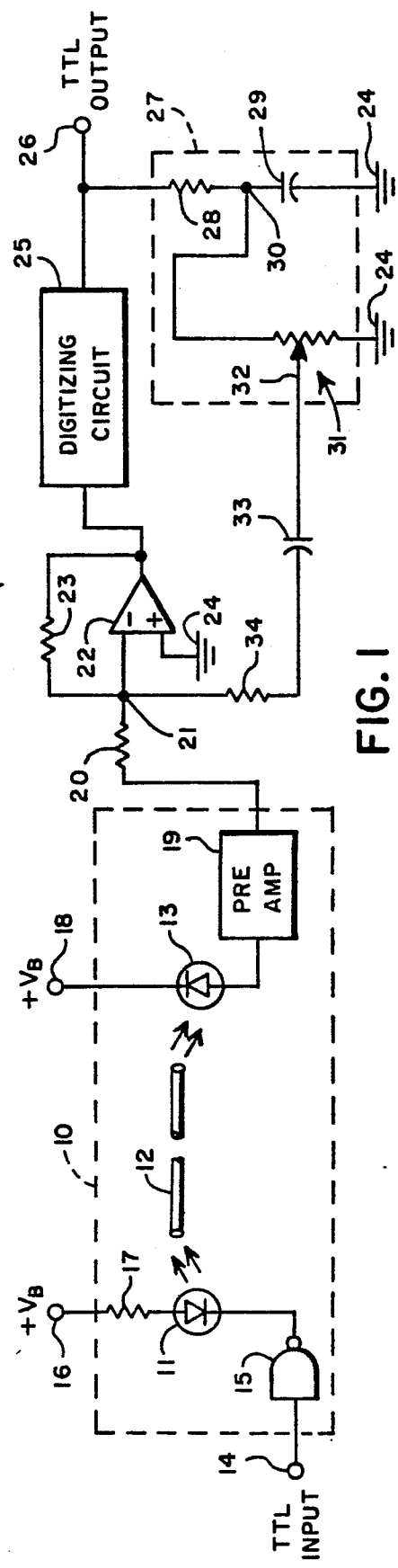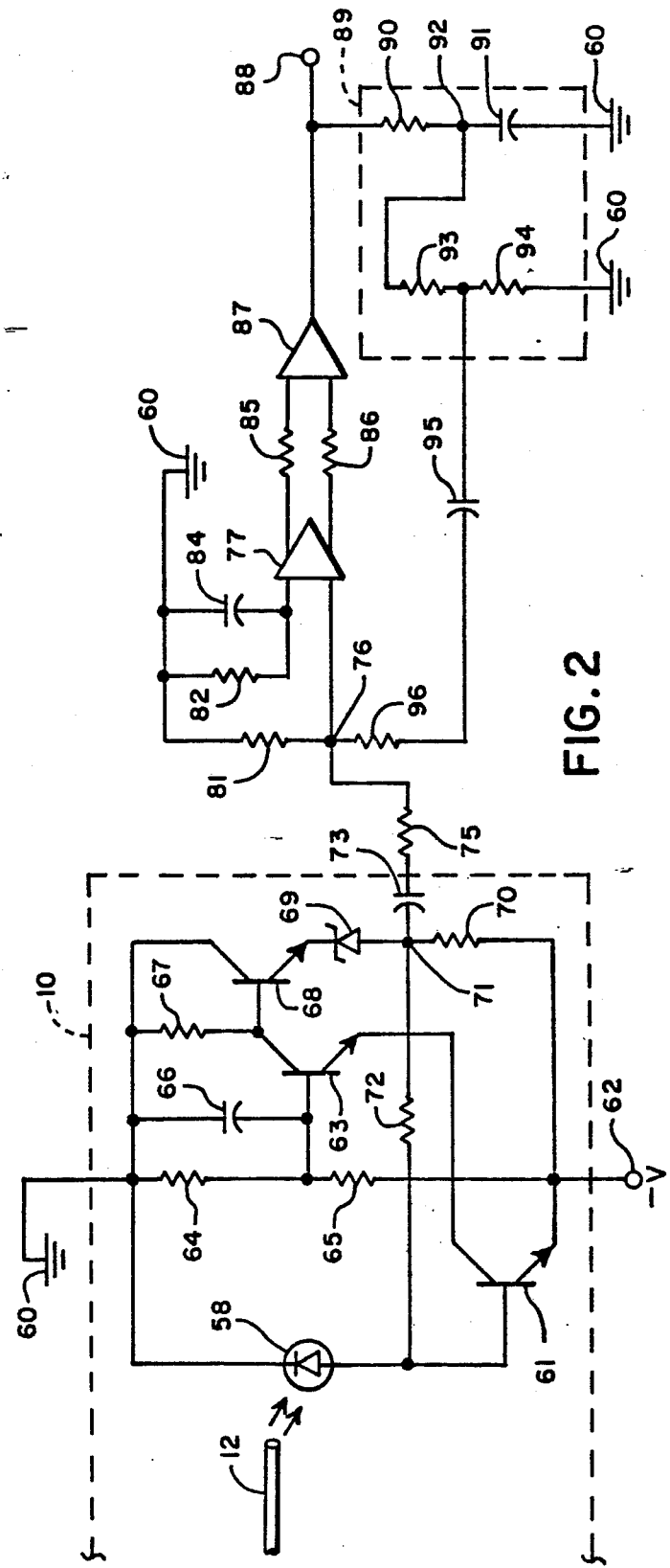

SIGNAL TRANSMISSION CIRCUIT WITH IMPROVED DIGITAL SIGNAL RECOVERY

BACKGROUND OF THE INVENTION

The present invention relates generally to signal transmitting circuits, and more specifically to circuits for transmitting high frequency digital signals. The invention is particularly applicable to systems of the type in which a data transmission link, including a fiber-optic element and associated signal conversion devices, is employed to transmit signals of a higher frequency than the normal upper operating frequency limit of the data link.

Transmission of data in digital form has become increasingly important with the advent and rapidly expanding use of digital data processors and processing techniques. Recent digital processing developments have resulted in very notable increases in the speed at which data processing can be accomplished, and in the amounts of data which can be practically processed. These developments have had the effect of markedly increasing demands on particularly the high frequency signal handling capabilities of digital data transmission circuits and systems. In addition, they have greatly increased the need for simple, low cost, high data rate circuits and systems.

One of the technologies which has recently received considerable attention in connection with the foregoing requirements is that of optical signal transmission. It is well known that optical data links potentially possess the capability of operation at much increased frequency bandwidths. However, the present state of the art is such that reasonably simple, low cost components and circuits required for practical optical data transmission have relatively low effective upper frequency limits.

At present, a typical optical system suitable for general purpose data transmission applications comprises a light emitting diode energized by an electrical data signal, a fiber-optic element for transmitting the resulting optical signal, and a photodetector for receiving the optical signal and converting it to a corresponding electrical signal. Examples of such systems are illustrated and described in the following articles:

(1) Gundlach, "Fiber-optic Developments Spark Worldwide Interest," *Electronics*, Aug. 5, 1976 (pages 81-104)

(2) Schmid, "Fiber-optic Data Transmission: A Practical, Low-Cost Technology," *Electronics*, Sept. 2, 1976 (pages 94-99)

These articles, as well as Hodapp, "Optical Isolators Yield Benefits in Many Linear Circuits," *Electronics*, Mar. 4, 1976 (pages 105-110), indicate that the highest frequency at which practical, relatively low cost optical data transmission systems are presently operable is about 10 mHz.

An additional data rate limitation occurs in systems utilizing Manchester coded digital signals. In such a coding format, data bits are represented by the directions of transition of signal level at equally spaced bit times. If any two successive data bits are the same, there must be an intermediate transition in signal level. This requires the transmission circuit to respond to a frequency twice the data bit rate. In addition, in some cases the system must transmit a synchronizing pulse having a duration of 3/2 of a bit period.

Manchester coding permits the use of AC coupling of digital signal circuits, and thereby avoids problems associated with drift of DC signal levels. However, its requirement of a system capable of transmitting frequencies higher than the data rate detracts from the other advantages inherent in optical data transmission systems of the above-described type.

Various schemes have been devised for increasing the bit rate of systems for transmitting Manchester coded data. For example, U.S. Pat. No. 3,979,746 issued to B. R. Jarrett on Sept. 7, 1976 discloses a Manchester coded demodulator for avoiding recovery time limitations of one-shot circuits used in some decoding arrangements to mask non-significant transitions. Such schemes do not, however, increase the upper frequency limit at which the basic signal transmission circuit can be used.

The applicant has discovered a unique technique and feedback means for permitting usable high frequency digital data signals to be transmitted over signal transmission circuits whose normal upper operating frequency limit is lower than the frequency of the data signals. Accordingly, the frequency and data rate handling capabilities of a digital signal transmission circuit comprising simple relatively low-cost components can be significantly increased.

SUMMARY OF THE INVENTION

The applicant's unique digital signal transmission circuit basically comprises signal transmitting means whose high frequency response is limited, as a result of which high frequency signals may be degraded during transmission, and digitizing means for producing a digital output signal having first and second values in response to input signal amplitudes respectively less than and greater than a digitizing threshold. The input signal to the digitizing means is supplied by means which combines the degraded signal with a feedback signal. The feedback signal is produced from the digital output signal by a feedback circuit whose high frequency response is substantially identical to the high frequency response of the signal transmitting means.

The primary object of this invention is to provide a method and apparatus for increasing the frequency at which a digital signal transmission circuit is usable.

It is a further object of this invention to provide a method and apparatus for enhancing recovery of high frequency digital signals from a signal transmission circuit.

A further object is to permit the use of simple relatively low cost components of modest capabilities to transmit signals at frequencies which exceed the normal operational capabilities of the components.

A further object is to provide a digital signal transmission circuit in which a unique feedback technique is employed to extend the high frequency capabilities of the circuit.

Yet a further object is to provide a feedback technique whereby high frequency digital signals degraded by transmission over a circuit of inadequate frequency capability can be restored to useful form.

Additional objects of the invention may be ascertained from a study of the disclosure, drawings and appended claims.

BRIEF DESCRIPTION OF THE DRAWINGS

FIG. 1 is a block diagram of a fiber-optic digital data transmission system employing the applicant's signal restoring feedback circuit;

FIG. 2 is a partial circuit diagram of the system shown in FIG. 1 showing the details of suitable amplifying and digitizing portions of the system and an alternate summing arrangement to that shown in FIG. 1.

DESCRIPTION OF THE PREFERRED EMBODIMENT

Figure 3:
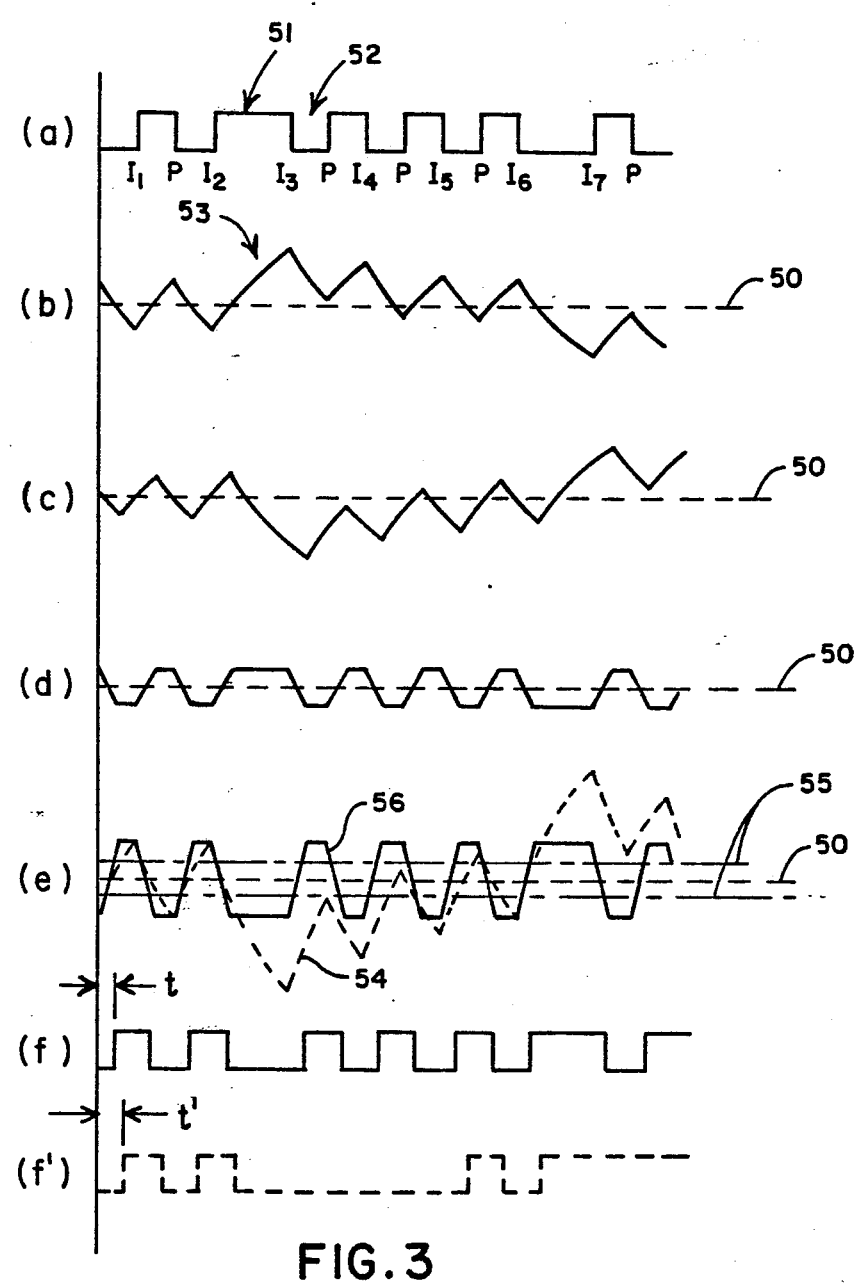
FIG. 3 illustrates waveforms at various points within the system of FIGS. 1 and 2, and shows the improvement achieved with the applicant's invention.

In FIG. 1, reference numeral 10 identifies a typical prior art fiber-optic digital data transmission link comprising a light emitting diode 11, a fiber-optic element 12 and a photodetector photodiode 13. Although a fiber-optic link is shown and described for illustrative purposes, it should be noted that the applicant's invention is equally as usable with and capable of enhancing the high frequency performance of other forms of digital signal transmitting means. An electrical digital data input signal is supplied through an input terminal 14 to a driver 15 whose output signal is supplied to the cathode of diode 11. The anode of diode 11 is provided with a bias voltage supplied at a terminal 16 through a bias resistor 17.

The cathode of photodetector 13 is connected to a source of bias voltage 18. The signal at the anode of detector 13 is supplied to a preamplifier 19 which produces the output signal of transmission link 10.

Fiber-optic data transmission link 10 is characterized by an output to input signal relationship, or transfer function, generally described by the expression KH(t), where K is a constant. More specifically, transmission link 10 has a single pole frequency response defined by a −3 db corner frequency of $1/(2\pi RC)$. Parameters R and C are such that the upper corner frequency for a typical simple, relatively low cost link is about 10 mHz. Accordingly, a digital input signal at a frequency significantly in excess of 10 mHz will result in an output signal from transmission link 10 which is considerably altered or degraded from the input signal.

Waveform (a) of FIG. 3 is illustrative of a typical Manchester coded digital data input signal. Waveform (b) illustrates the corresponding degraded output signal produced by transmission link 10 if the input signal thereto is of a substantially higher frequency than the normal high frequency capability of the link. It can be seen that, rather than faithfully following the square wave input signal, the output signal has degenerated to a series of exponential waveform segments having a positive slope when the digital signal is at its upper value and a negative slope when the digital signal is at its lower value.

For completeness, the waveform of FIG. 3(a) is marked with transitions $I_1, I_2, \ldots, I_7$ which represent information transitions or bits, and transitions P which represent necessary intermediate or phase transitions. It can be seen that transitions $I_1$ and $I_2$ represent identical successive information bits (e.g., both binary ones). Conversely, transitions $I_2$ and $I_3$ represent opposite successive information bits (e.g., a binary one followed by a binary zero). It can also be seen that the digital input signal level remains constant for two successive half bit periods when information bits change state (i.e., from a one to a zero, or a zero to a one).

The amplitude of the transmission link output signal shown in FIG. 3(b) varies about a reference amplitude identified by dashed line 50. The response of transmission link 10 is such that as long as the digital input signal regularly alternates between its upper and lower values, the nominal DC level of the output signal remains at reference amplitude 50. However, if the digital input signal remains at one value longer (i.e., two half-bit periods as shown at 51) than it remains at a succeeding opposite value (i.e., one half-bit period as shown at 52), the DC value of the output signal rises above the reference amplitude as shown at 53. Thereafter the output signal requires several half-bit periods of alternating input signal values for its nominal DC level to settle back to reference amplitude 50. For reasons which will be described hereinafter, this tends to cause errors in the transmitted signal.

The output signal of transmission link 10 is supplied through a first summing resistor 20 to a summing point 21 which is connected to the inverting input of a differential amplifier 22. A local feedback resistor 23 is connected between the output of amplifier 22 and summing point 21 to establish the gain of the amplifier. The non-inverting input of amplifier 22 is connected to a reference potential source or ground 24.

The output terminal of amplifier 22 is connected to a digitizing circuit 25 which produces the output signal of the signal transmission circuit through an output terminal 26. For present purposes, elements 21–26 will be collectively referred to as an output circuit. The output signal produced by the output circuit is a digital signal having first and second values in response to input signal amplitudes respectively less than and greater than a digitizing threshold.

Absent a feedback signal which will hereinafter be described in greater detail, the input signal to digitizing circuit 25 would be an amplified inverted version of the degraded output signal of transmission link 10. Such a signal is illustrated by dashed line waveform 54 in FIG. 3(e), in which the digitizing threshold is indicated by lines 55. As illustrated, the digitizing threshold is a predetermined amplitude above and below reference amplitude 50. Theoretically, reference amplitude 50 could be set as the digitizing threshold. However, the operation of many conventional digitizing circuits, such as Schmitt triggers, line receivers and comparators, is characterized by a dead zone of typically 30 to 300 mv, as represented between lines 55.

With an input signal as illustrated by waveform 54, digitizing circuit 25 produces the output signal shown in FIG. 3(f). More specifically, the output signal is switched to its lower value as the input signal crosses lower digitizing threshold 55 in a negative direction, and switches to its upper value as waveform 54 crosses upper digitizing threshold 55 in a positive direction. It can be seen from the waveform of FIG. 3(f) that the digital output signal produced by the signal transmission circuit is significantly delayed, as indicated by t', from the digital input signal supplied to the transmission circuit. More significantly, information bits $I_3$, $I_4$ and $I_7$ are not reproduced in the digital output signal. The cause of this failure is apparent from an examination of waveform 54 which, for information bits $I_3$ and $I_4$, does not cross upper digitizing threshold 55, and for information bit $I_7$, does not cross lower digitizing threshold 55.

The applicant has overcome the previously described problem by providing a feedback circuit 27 between the output of digitizing circuit 25 and summing point 21. Feedback circuit 27 has a transfer function kH(t), where k is a scaling constant proportional to scaling constant K in the transfer function for transmission link 10, and having a value which will match the amplitude of the feedback signal to that of the output signal of link 10.

As shown, feedback circuit 27 comprises a resistor 28 having resistance R and a capacitor 29 having capacitance C connected in series between output terminal 26 and ground 24. The junction between resistor 28 and capacitor 29, identified by reference numeral 30, is connected to ground 24 through a voltage divider 31. The feedback signal produced by feedback circuit 27 appears at a variable voltage terminal 32 of voltage divider 31, and is supplied to summing point 21 through a coupling capacitor 33 connected in series with a second summing resistor 34.

As a result of the resistance and capacitance values of resistor 28 and capacitor 29, feedback circuit 27 has a time constant RC, which gives it a high frequency response substantially identical to the high frequency response of transmission link 10. Feedback circuit 27 responds to the digital output signal of digitizing circuit 25 in the same manner that link 10 responds to the digital input signal at input terminal 14. Accordingly, the feedback signal is of the same form as the degraded signal produced by link 10. The feedback signal is inverted from the degraded signal as a result of the inverting effect of amplifier 22, and may be described as a delayed inverted replica of the degraded signal. The amplitude of the feedback signal is set by voltage divider 31 so as to have approximately the same amplitude as the degraded signal.

The feedback signal and the degraded signal are combined at summing point 21. The combined signal is, in effect, a different signal as the result of the signal inversion effected by amplifier 22. The difference signal, which appears at summing point 21 is illustrated in FIG. 3 as waveform (d). This waveform is inverted and amplified as shown by waveform 56 in FIG. 3(e), and supplied as the input signal to digitizing circuit 25.

The input signal illustrated by waveform 56 causes circuit 25 to produce the digital output signal illustrated by the waveform of FIG. 3(f). As previously described, circuit 25 responds to the signal illustrated by waveform 56 by producing a digital signal which is switched to a first (lower) value as waveform 56 passes through lower digitizing threshold 55 in a negative direction, and switches to a second (upper) value as waveform 56 passes through upper threshold 55 in a positive direction.

As can be seen from FIG. 3(f), the applicant's feedback circuit results in a digital output signal which is less delayed than the output signal produced without the feedback circuit, and one in which information bits are not omitted. Accordingly, use of the feedback circuit permits a signal transmission circuit of relatively modest frequency capabilities to be effectively used to transmit digital signals of significantly higher frequency than that for which the system could otherwise be used.

FIG. 2 illustrates in somewhat greater detail the amplifier portion of data transmission link 10 and succeeding portions of the applicant's signal transmission circuit. An optical signal transmitted by fiber-optic element 12 is received by a photodiode 58 whose cathode is connected to reference potential source or ground 60. The anode of diode 58 is connected to the base of a first NPN transistor 61 whose emitter is maintained at a negative voltage −V supplied to a terminal 62. The operation of photodiodes, such as diode 58, is such that the current therethrough is directly proportional to the incident light power. Transistor 61 is always biased to a conducting state. Accordingly, the base of transistor 61 and anode of diode 58 are maintained at a voltage slightly above the voltage supplied to terminal 62 by virtue of the forward voltage drop across the base-emitter junction of the transistor. As a result of the constant voltage across diode 58, operation of the circuit is not influenced by capacitance of the diode.

The current through diode 58 passes through the base-emitter junction, and effects amplification of the collector current through transistor 61. This collector current is supplied by a second NPN transistor 63 whose base is maintained at a fixed voltage by a voltage divider comprising resistors 64 and 65 connected between ground 60 and terminal 62. Resistor 64 is bypassed by a filter capacitor 66. The collector of transistor 63 is connected to ground 60 through a resistor 67 through which flows the current supplied to the collector of transistor 61. Accordingly, the current through resistor 67 varies as the light power incident on diode 58.

The voltage developed across resistor 67 is supplied to the base of a third NPN transistor 68 which is connected in an emitter-follower configuration, having its collector connected to ground 60 and its emitter connected through a Zener diode 69 and a resistor 70 to terminal 62. The output signal of link 10 is produced at junction point 71 between the anode of diode 69 and resistor 70. A local feedback resistor 72, which establishes the gain of the amplifier portion of transmission link 10, is connected between junction 71 and the anode of diode 58. The signal at junction 71 is supplied to succeeding portions of the signal transmission circuit through a coupling capacitor 73.

The output signal voltage produced by link 10 is directly proportional to the current through diode 58. Because of the frequency limitations of the light emitting and detecting portions of the link, this signal is a degraded version of a digital input signal supplied to the link, and may have the form shown in FIG. 3(b). The output signal of link 10 is supplied through a resistor 75 to a junction point 76 which serves as a summing point for combining the degraded signal and a feedback signal. The combined signal is amplified by means of a differential amplifier 77 whose input terminals are supplied with slightly different bias voltages through resistors 81 and 82. Resistors 81 and 82 are selected to have values which will produce a balanced DC output from amplifier 77. Resistor 82 is bypassed with a filter capacitor 84.

The output terminals of amplifier 77 are connected through resistors 85 and 86 to the input terminals of a digitizing amplifier 87. As previously described, amplifier 87 produces a digital output signal having a first value when the differential input signal supplied thereto passes through a digitizing threshold in one sense, and a second value when the differential input signal passes through the digitizing threshold in the opposite sense. The output signal of amplifier 87 is supplied through a terminal 88 which comprises the output terminal of the signal transmission circuit.

The digital output signal at terminal 88 is also supplied to a feedback circuit 89 which comprises a resistor 90 and a capacitor 91 connected between output terminal 88 and ground 60. A junction 92 between resistor 90 and capacitor 91 is connected to ground 60 through a voltage divider comprising series connected resistors 93 and 94. The feedback signal is produced at the junction of resistors 93 and 94, and is supplied to junction point 76 through a coupling capacitor 95 and a resistor 96.

The circuitry of FIG. 2 operates as previously described to enhance high frequency performance of the associated signal transmission elements. The feedback signal, which comprises a delayed inverted replica of the degraded signal produced by link 10, is combined with the degraded signal to produce an output signal from digitizing amplifier 87 which more closely follows the digital input signal to the transmission circuit. As a result, the digital output signal of the circuit is less delayed and more representative of the digital input signal at higher signal frequencies.

Although an embodiment of the applicant's unique signal transmission circuit with feedback means for enhancing high frequency digital signal recovery has been shown and described for illustrative purposes, other embodiments which do not depart from the applicant's contemplation and teaching will be apparent to those skilled in the art. The applicant does not intend that coverage be limited to the disclosed embodiment, but only by the terms of the appended claims.

The embodiments of the invention in which an exclusive property or right is claimed are defined as follows:

1. A digital signal transmission circuit capable of restoring high frequency signals degraded during transmission comprising:
   signal transmitting means whose response to high frequency signals is characterized by a transfer function KH(t), and a −3 db corner frequency of $1/(2\pi RC)$;
   input means for supplying a digital input signal to said signal transmitting means;
   a digitizing circuit adapted to receive an input signal of variable amplitude, and to produce a digital output signal having first and second values in response to input signal values respectively less than and greater than a digitizing threshold;
   summing means connecting said signal transmitting means and said digitizing circuit, said summing means being operable to combine a signal supplied by said signal transmitting means and a feedback signal;
   a feedback circuit having a transfer function kH(t) proportional to transfer function KH(t), said feedback circuit comprising a resistor and a first capacitor connected in series between the output of said digitizing circuit and ground; and
   coupling means comprising a voltage divider having a first terminal connected to the junction between the resistor and the first capacitor in said summing means, a second terminal connected to ground and a variable voltage terminal connected to said summing means through a second capacitor.

2. The digital signal transmission circuit of claim 1 wherein said signal transmitting means comprises:
   a fiber-optic element;
   a light emitting diode for supplying an optical signal corresponding to the digital input signal to said fiber-optic element; and
   means for receiving the optical signal from said fiber-optic element and producing a corresponding electrical signal.

3. In a digital signal transmission circuit including signal transmitting means having a limited high frequency response characterized by a −3 db corner frequency of $1/(2\pi RC)$, as a result of which high frequency signals are degraded during transmission, and further including digitizing means for producing a digital output signal having first and second values in response to input signal amplitudes respectively less than and greater than a digitizing threshold, improved signal restoring means comprising:
   a feedback circuit having a high frequency response substantially identical to the high frequency response of said signal transmitting means, said feedback circuit comprising a resistor of resistance R and a first capacitor of capacitance C connected in series between the output signal terminal of said digitizing means and ground, a voltage divider connected to the junction between said resistor and said first capacitor, and a second capacitor connected between a variable voltage terminal on said voltage divider and said summing means;
   means for supplying the digital output signal to said feedback means so that said feedback means produces a feedback signal in the form of an inverted replica of the degraded signal transmitted by said signal transmitting means;
   summing means for combining the feedback and degraded signals to form a difference signal; and
   means for supplying the difference signal as the input signal to said digitizing means.

4. A digital signal transmission circuit with feedback means for achieving enhanced high frequency performance comprising:
   input means for supplying a digital input signal;
   signal transmission means connected to receive the digital input signal, said signal transmission means comprising a fiber-optic element, a light emitting diode for supplying an optical signal corresponding to the digital input signal to said fiber-optic element, and a photodetector device for receiving the optical signal from said fiber-optic element and producing a corresponding electrical output signal, the frequency response characteristics of said signal transmission means being such that the output signal is a degenerate form of the digital input signal;
   digitizing means responsive to a variable amplitude input signal for producing a digital output signal having first or second values if the amplitude of the input signal is respectively less than or greater than a digitizing threshold;
   summing means connecting said signal transmission means to said digitizing means;
   feedback means having frequency response characteristics substantially identical to the frequency response characteristics of said signal transmission means;
   means for supplying the digital output signal to said feedback means, whereby said feedback means produces a feedback signal which is a delayed inverted replica of the output signal of said signal transmission means; and
   means for connecting said feedback means to said summing means so that said summing means supplies a signal to said digitizing means representative of the combined feedback signal and the output signal of said signal transmission means.

* * * * *